(12) United States Patent
Deakin et al.

(10) Patent No.: US 8,806,235 B2
(45) Date of Patent: Aug. 12, 2014

(54) DISPLAY MANAGEMENT FOR MULTI-SCREEN COMPUTING ENVIRONMENTS

(75) Inventors: Oliver Deakin, Southampton (GB); Jamin H. Deakin, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/160,482

(22) Filed: Jun. 14, 2011

(65) Prior Publication Data

US 2012/0324256 A1  Dec. 20, 2012

(51) Int. Cl.
*G06F 1/32* (2006.01)

(52) U.S. Cl.
USPC ........... 713/300; 713/310; 713/320; 713/321; 713/322; 713/323; 713/324; 713/330; 713/340; 345/1.1; 345/212

(58) Field of Classification Search
USPC ................. 713/300, 310, 320–324, 330, 340; 345/1.1, 212
See application file for complete search history.

(56) References Cited

U.S. PATENT DOCUMENTS

| | | | |
|---|---|---|---|
| 6,509,911 B1 * | 1/2003 | Shimotono | 715/761 |
| 7,036,025 B2 | 4/2006 | Hunter | |
| 7,379,560 B2 | 5/2008 | Bradski et al. | |
| 7,580,033 B2 | 8/2009 | Plut | |
| 7,614,011 B2 | 11/2009 | Karidis et al. | |
| 8,294,725 B2 * | 10/2012 | Iwaki et al. | 345/547 |
| 2006/0192775 A1 | 8/2006 | Nicholson et al. | |
| 2007/0078552 A1 | 4/2007 | Rosenberg | |
| 2008/0111833 A1 | 5/2008 | Thorn et al. | |
| 2010/0079508 A1 * | 4/2010 | Hodge et al. | 345/697 |
| 2011/0109608 A1 * | 5/2011 | Kim | 345/211 |

OTHER PUBLICATIONS

IBM, "System for User-defined and Application-controlled Backlighting on Display Screens for Power Saving Schemes on Portable Devices," IP.Com, IPCOM000193321D.Feb. 18, 2010.
IBM, "Method of Power Optimization Based on User Presence and Gaze Detection," IP.Com, IPCOM000142549D. Nov. 1, 2006.
IBM, "Simple Gaze Detection to Adjust Power-Saving Time-out," IP.Com, IPCOM000132730D. Jan. 6, 2006.
Moshnyaga, et al., "LCD display energy reduction by user monitoring," IEEE, Proceedings, International Conference on Computer Design, 94-7, 2005.

* cited by examiner

*Primary Examiner* — M Elamin
(74) *Attorney, Agent, or Firm* — Steven M. Greenberg, Esq.; CRGO Law

(57) ABSTRACT

Embodiments of the present invention provide a method, system and computer program product for power management for a multi-display computing environment. In an embodiment of the invention, a computer data processing system can be configured for power management for a multi-display computing environment. The system can include a computer with at least one processor and memory, a video display adapter disposed in the computer and multiple different displays driven by the adapter. The system also can include a selective power management module coupled to the computer and configured to selectively apply power management to only one of the displays in which a period of inactivity is detected, while not applying power management to remaining ones of the displays.

15 Claims, 1 Drawing Sheet

DISPLAY MANAGEMENT FOR MULTI-SCREEN COMPUTING ENVIRONMENTS

BACKGROUND OF THE INVENTION

1. Field of the Invention

The present invention relates to the field of power management and more particularly to display management for multi-screen computing environments.

2. Description of the Related Art

Power management refers to the management of the consumption of power by a computing device. Power management can be performed with respect to an entire computing system, or with respect to individual components of a computing system. In this regard, components of a computing system ranging from the network interface card to the disk drive have been individually managed for optimal power consumption. Of note, while initially power management found purpose in prolonging battery life in portable computing devices, power management has found equal purpose in reducing power consumption in support of environmental conservation and in support of data privacy and security.

It is well known that display devices consume substantial power during operation. Thus, power management as applied to a display device generally involves the strategic reduction in display intensity responsive to a detected absence of interaction with a corresponding computer. After a prolonged absence of interaction, the display can be completely deactivated. In this way, the power otherwise consumed by the display can be conserved. To the extent that the absence of interaction is interpreted as the separation of an end user from the computer, the deactivation of the display can act as a privacy and security measure.

Recently, with the advancement of liquid crystal display (LCD) technology in flat panel displays that consume a small physical footprint, and the relative affordability of flat panel displays, end users have coupled multiple different displays to a single computer through a multi-display adapter. While each individual display can display an identical image of the same desktop, many opt to drive the display adapter to cause the display of the desktop computing environment across the aggregation of the multi-display environment. Consequently, in the latter circumstance, each display can show only a designated portion of the desktop computing environment.

Power management in respect to the multi-display environment differs little if any from the single display computing environment. In this regard, after a detected period of inactivity in the computer, the intensity of display of each display can be reduced accordingly. After detecting a prolonged absence of activity in the computer, all displays can be disabled. Notwithstanding, end users engage the multi-display environment differently than the single display environment. In this regard, in a multi-display environment, typically the end user focuses upon one display showing a portion of a desktop environment of interest, to the exclusion of other displays in the multi-display environment showing respectively different portions of the desktop environment. Thus, on many occasions, the excluded displays consume power needlessly.

BRIEF SUMMARY OF THE INVENTION

Embodiments of the present invention address deficiencies of the art in respect to power management for computer displays and provide a novel and non-obvious method, system and computer program product for power management for a multi-display computing environment. In an embodiment of the invention, a computer data processing system can be configured for power management for a multi-display computing environment. The system can include a computer with at least one processor and memory, a video display adapter disposed in the computer and multiple different displays driven by the adapter. The system also can include a selective power management module coupled to the computer and configured to selectively apply power management to only one of the displays in which a period of inactivity is detected, while not applying power management to remaining ones of the displays.

In one aspect of the embodiment, the system can include an eye detector detecting when a gaze from an end user indicates a period of inactivity with respect to a display amongst the displays. In another aspect of the embodiment, the period of inactivity can be detected when no user input has been received in connection with a graphical user interface (GUI) desktop portion displayed in a corresponding one of the displays. In other aspects of the embodiment, the selectively applied power management is a dimming of a corresponding display, or a putting to sleep of a corresponding display or an invoking of a screen saver in a corresponding display.

In another embodiment of the invention, a power management method for a multi-display computing environment is provided. The method includes monitoring activity in connection with a plurality of displays coupled to a single computer. The method also includes detecting a period of inactivity in a particular one of the displays. The method yet further includes directing power management only in the particular one of the displays, but not in remaining others of the displays in response to detecting a period of activity in the particular one of the displays. In one aspect of the embodiment, the activity is monitored through eye tracking and gaze detection. In another aspect of the embodiment, the power management is a dimming of the particular one of the displays. In yet another aspect of the embodiment, the power management is a putting to sleep of the particular one of the displays. Finally, in even yet another aspect of the embodiment, the power management is an invoking of a screen saver in the particular one of the displays.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for power management for a multi-display computing environment. In accordance with an embodiment of the invention, activity can be monitored for different displays coupled to a single computer. Responsive to detecting inactivity associated with a particular one of the displays, power reduction such as screen diming, screen saver activation, or screen deactivation to name a few examples can be implemented in the particular one of the displays while remaining ones of the displays in which activity is detected can remain without power reduction. Of note, the inactivity can be detected through gaze tracking of an end user, time-out conditions in applications displayed within the displays, and the like. In this way, power consumption reduction and also privacy and security measures can be implemented selectively in only inactive displays in a multi-display environment.

Figure 1:
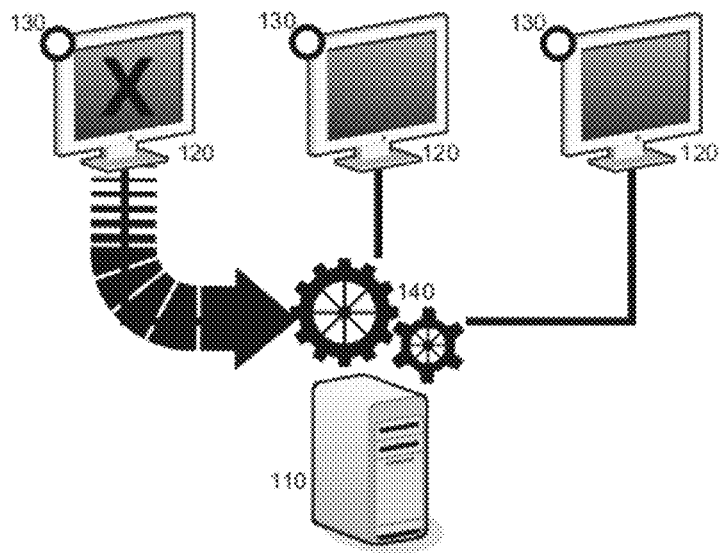
FIG. 1 is a pictorial illustration of a process for power management for a multi-display computing environment.

FIG. 1 is a pictorial illustration of a process for power management for a multi-display computing environment. As shown in FIG. 1, a multi-display computing environment can be created through the driving of multiple displays 120 for a single computer 110. One or more activity monitors 130 can be associated with the multiple displays 120 either individually in connection with each of the multiple displays 120, or centrally in connection with the computer 110. Power management logic 140 can receive an indication from an activity monitor 130 that a period of inactivity has occurred in respect to a particular one of the multiple displays 120. In response, power management logic 140 can initiate power management for the particular one of the multiple displays 120 such as screen dimming or screen saver launching or display sleeping. However, power management need not be initiated for the remaining ones of the multiple displays 120.

Figure 2:
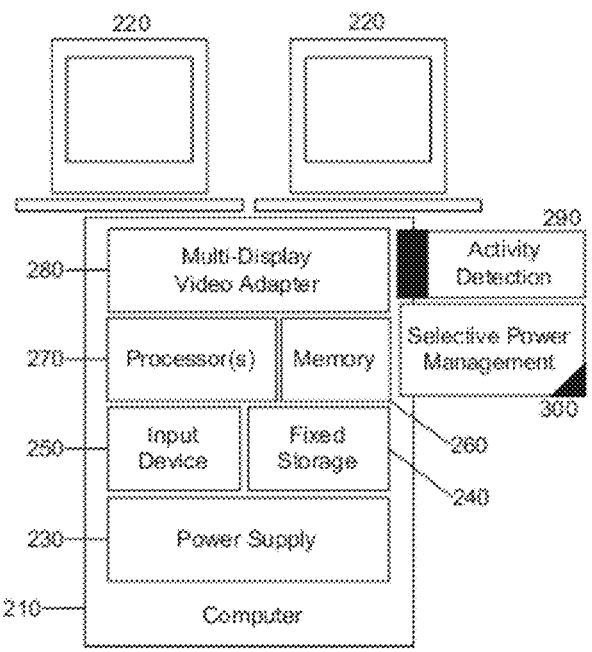
FIG. 2 is a schematic illustration of a computer data processing system configured for power management for a multi-display computing environment; and, FIG. 3 is a flow chart illustrating a process for power management for a multi-display computing environment.

The process described in connection with FIG. 1 can be implemented within a computer data processing system. In further illustration, FIG. 2 schematically shows a computer data processing system configured for power management for a multi-display computing environment. The system can include a computer 210 coupled to multiple different displays 220. The computer 210 can include a power supply 230 powering one or more processors 270 and memory 260, along with fixed storage 240 and an input device 250 such as a keyboard, mouse pointing device and the like. Of note, power supply 230 additionally can power a multi-display video adapter 280 driving the multiple different displays 220. In this regard, a GUI desktop for an operating system executing in the memory 260 of the computer 210 can be displayed in the aggregate across the multiple displays 220 such that each of the displays 220 can display a portion of the GUI desktop.

Activity detection module 290 can be coupled to the multi-display video adapter 280. The activity detection module 290 can detect periods of inactivity with respect to one or more of the displays 220, for example by eye tracking and gaze detection of an end user, or by detecting a period in which no input has been received for an application displayed in a corresponding one of the displays 220. The activity detection module 290 in turn can be coupled to selective power management module 300. The selective power management module 300 can include program code that when executed in the memory 260 of the computer 210, can respond to a signal from the activity detection module 290 that a period of inactivity has been detected in a particular one of the displays 220. The response can include invoking power management in the particular one of the displays 220, such as directing screen dimming in the particular one of the displays 220, directing the particular one of the displays 220 to "sleep", or to invoke a screen saver in the particular one of the displays 220.

Figure 3:
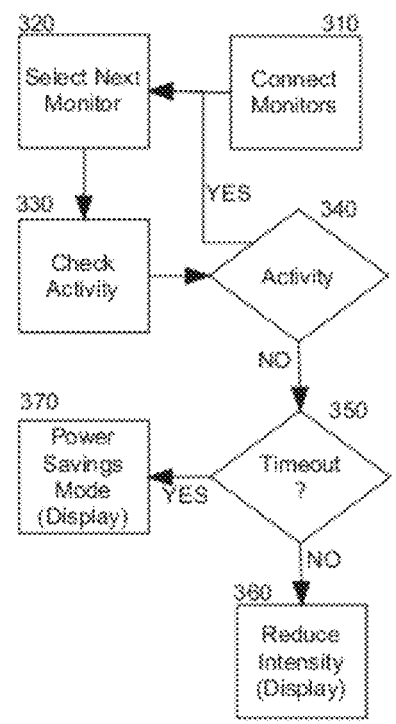

In even yet further illustration of the operation of the selective power management module 300, FIG. 3 is a flow chart illustrating a process for power management for a multi-display computing environment. Beginning in block 310, a set of displays can be connected to a display adapter for management and in block 320 a first display can be selected for processing. In block 330, activity can be detected in the display. In decision block 340, if activity is detected, a next connected display can be selected for processing in block 320. However, if a period of inactivity is detected in the selected display in decision block 340, in decision block 350, it can be determined if the period of inactivity in the selected display has exceeded a threshold value. If not, an intensity of display can be reduced in block 360. Otherwise, a power savings mode can be directed for the selected display by putting the display to sleep in block 370.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A computer data processing system configured for power management for a multi-display computing environment, the system comprising:
    a computer with at least one processor and memory;
    a video display adapter disposed in the computer;
    multiple different displays driven by the adapter; and,
    a selective power management module coupled to the computer and configured to:
        monitor activity in connection with multiple different displays;
        detect a period of inactivity in a particular one of the displays;
        determine if the period of inactivity in the particular one of the displays has exceeded a threshold value;
        in response to a determination that the period of inactivity in the particular one of the displays has not exceeded a threshold value, reduce an intensity of display on the particular one of the displays; and
        in response to a determination that the period of inactivity in the particular one of the displays has exceeded a threshold value, direct power management only in the particular one of the displays, but not in remaining others of the displays.

2. The system of claim 1, further comprising an eye detector detecting when a gaze from an end user indicates a period of inactivity with respect to a display amongst the displays.

3. The system of claim 1, wherein the power management is a dimming of a corresponding display.

4. The system of claim 1, wherein the power management is a putting to sleep of a corresponding display.

5. The system of claim 1, wherein the power management is an invoking of a screen saver in a corresponding display.

6. A power management method for a multi-display computing environment, the method comprising:

monitoring activity in connection with a plurality of displays coupled to a single computer by a selective power management module executed in a memory of the computer;

detecting a period of inactivity in a particular one of the displays;

determining if the period of inactivity in the particular one of the displays has exceeded a threshold value;

in response to a determination that the period of inactivity in the particular one of the displays has not exceeded a threshold value, reducing an intensity of display on the particular one of the displays; and, in response to a determination that the period of inactivity in the particular one of the displays has exceeded a threshold value, directing power management only in the particular one of the displays, but not in remaining others of the displays.

7. The method of claim 6, wherein the activity is monitored through eye tracking and gaze detection.

8. The method of claim 6, wherein the power management is a dimming of the particular one of the displays.

9. The method of claim 6, wherein the power management is a putting to sleep of the particular one of the displays.

10. The method of claim 6, wherein the power management is an invoking of a screen saver in the particular one of the displays.

11. A computer program product for power management for a multi-display computing environment, the computer program product comprising:

a computer readable storage medium having computer readable program code embodied therewith, the computer readable program code, when executed by a computer, causes the computer to perform the steps comprising:

monitoring activity in connection with a plurality of displays coupled to a single computer;

detecting a period of inactivity in a particular one of the displays;

determining if the period of inactivity in the particular one of the displays has exceeded a threshold value;

in response to a determination that the period of inactivity in the particular one of the displays has not exceeded a threshold value, reducing an intensity of display on the particular one of the displays; and, in response to a determination that the period of inactivity in the particular one of the displays has exceeded a threshold value, directing power management only in the particular one of the displays, but not in remaining others of the displays.

12. The computer program product of claim 11, wherein the activity is monitored through eye tracking and gaze detection.

13. The computer program product of claim 11, wherein the power management is a dimming of the particular one of the displays.

14. The computer program product of claim 11, wherein the power management is a putting to sleep of the particular one of the displays.

15. The computer program product of claim 11, wherein the power management is an invoking of a screen saver in the particular one of the displays.

* * * * *

UNITED STATES PATENT AND TRADEMARK OFFICE
CERTIFICATE OF CORRECTION

PATENT NO. : 8,806,235 B2  
APPLICATION NO. : 13/160482  
DATED : August 12, 2014  
INVENTOR(S) : Deakin et al.

Page 1 of 1

It is certified that error appears in the above-identified patent and that said Letters Patent is hereby corrected as shown below:

Title page

(75) Inventors: Delete "Jamin" and insert --Jasmin--.

Signed and Sealed this  
Twenty-first Day of July, 2015

Michelle K. Lee  
*Director of the United States Patent and Trademark Office*